Jan. 17, 1956  A. PARISI  2,731,138
BELT CONVEYOR FRAME CONSTRUCTION
Filed Aug. 27, 1952  2 Sheets-Sheet 1

Inventor
Anthony Parisi
By J. Irving Silverman
Attorney

Jan. 17, 1956  A. PARISI  2,731,138
BELT CONVEYOR FRAME CONSTRUCTION
Filed Aug. 27, 1952  2 Sheets-Sheet 2
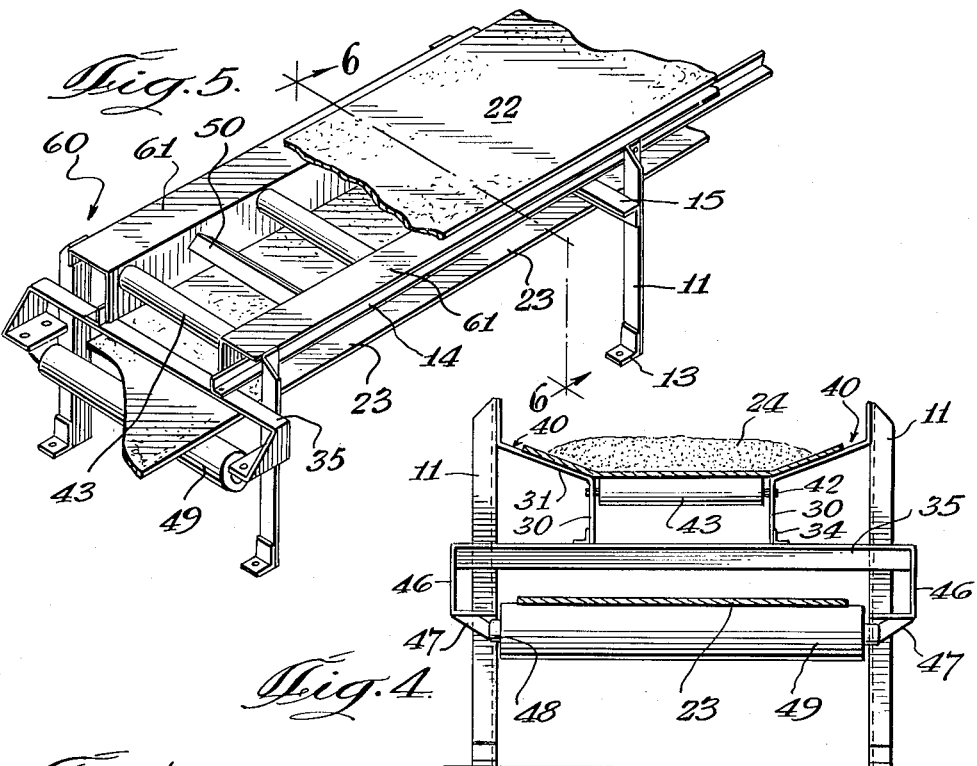
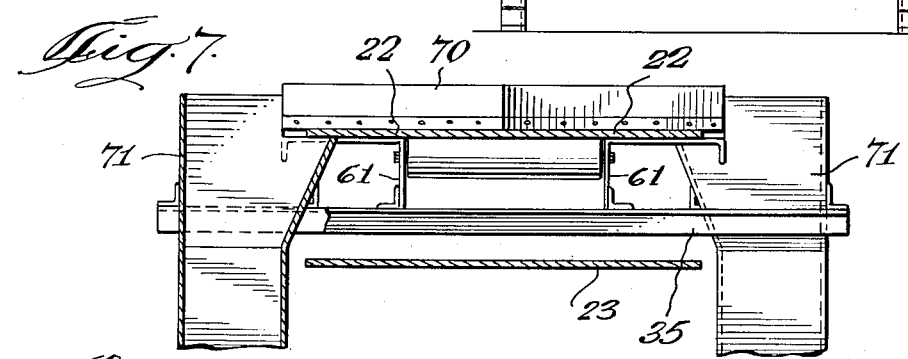
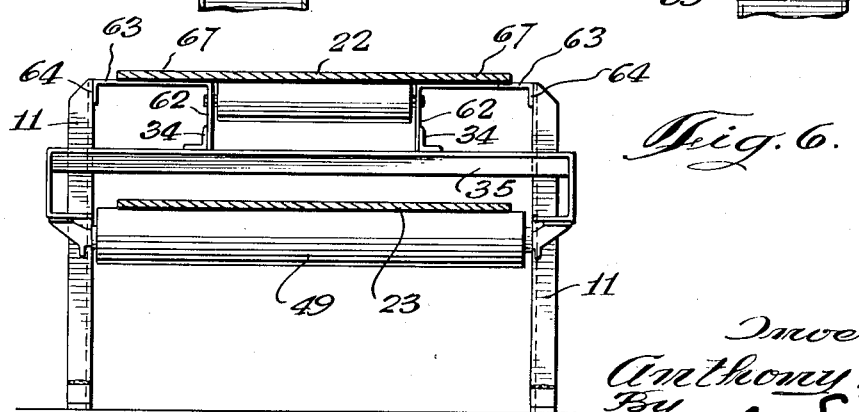
Inventor
Anthony Parisi
By J. Irving Silverman
Attorney 2,731,138

BELT CONVEYOR FRAME CONSTRUCTION

Anthony Parisi, Pontiac, Mich., assignor to Pekay Machine and Engineering Co., Inc., Chicago, Ill., a corporation of Illinois Application August 27, 1952, Serial No. 306,623

3 Claims. (Cl. 198—204)

This invention relates to conveyor systems and more particularly is concerned with a conveyor of the belt type for handling material of a granular, pulverulent or analogous nature. The conveyor embodying the invention is especially adapted for transporting such material in foundries and the like.

The conventional belt conveyor designed to transport granular material such as molding sands, for instance, in a foundry consists of an endless belt supported at each end by drive rollers, one being referred to as the head roll and the other as the tail roll. Between the drive rollers, the conveyor belt further is supported on a plurality of spaced idler rollers journaled in an upright frame. The conveyor belt includes an upper and lower reach and the granular material is carried along the upper reach to a point where it is unloaded for further use in the foundry. The heretofore conventional belt conveyor possesses certain inherent disadvantages which result in conditions which this invention is designed to eliminate.

In the conventional belt conveyor granular material being carried along the belt is apt to spill over the belt edges along the entire length thereof since no adequate containing means are provided for preventing undue spilling of the material. The spilled granular material also accumulates around the drive rollers and idler rollers causing the rollers to bind and become pitted or otherwise damaged. Such damaged rollers cause the belt also to become quickly worn and frayed thereby shortening the life of the belt. Because the belt is supported on idler rollers spaced apart a substantial distance, the belt would bend unduly at the portions thereof between the idler rollers especially when a heavy load was being carried by the belt, thereby placing the belt under great stress. In addition, material spilled along the length of the belt would otherwise clog the apparatus and also spill to the floor increasing the cost of maintenance of the apparatus and loss of material.

To eliminate the spilling of granular material, it has heretofore been the practice to provide special troughing equipment on the conveyor apparatus in the nature of troughing rolls which were designed to trough the granular material and retain same on the conveyor belt. This equipment increases the cost of the conveyor apparatus and has been found only to eliminate partially spilling of material from the belt.

Accordingly, it is a primary object of this invention to provide a conveyor belt construction of the character described designed to eliminate substantially all of the disadvantages above enumerated in connection with the heretofore conventional conveyor belt system.

Another object of the invention is to provide a conveyor belt construction of the character described having means extending along the length of the belt on either side thereof for supporting the belt along the entire length thereof.

Another object of the invention is to provide novel means in conveyor belt apparatus of the character described for preventing material carried along the belt from spilling over the side edges of the belt.

Still another object of the invention is to provide a conveyor belt construction of the character described having fixed support members between the idler rollers thereof thereby preventing sagging of the belt between the idler rollers, and permitting a greater span between the upright supports of the frame.

Still another object of the invention is to provide a conveyor belt construction of the character described in which granular material spilling over the edges of the belt will be guided to the lower reach of the said belt instead of haphazardly spilling on the floor around the conveyor construction.

Further objects of the invention are to provide conveyor belt apparatus of the character described in which the conveyor belt will enjoy a greater belt life, the drive rollers and idler rolls will not become rapidly frayed and worn, which reduces the cost of the supporting frame for the apparatus and which is characterized by its greater strength and load capacity.

An important object of the invention is the provision of a novel troughing conveyor.

These and other objects of the invention will become apparent as the description thereof proceeds, in connection with which certain preferred embodiments of the invention have been shown in the accompanying drawings. Minor variations in size and arrangement of the parts may occur to the artisan skilled in the art to which the invention appertains without departing from the spirit or scope thereof.

In the drawings where the same characters are used to point out identical or similar parts of the invention:

Fig. 4 is a sectional view taken through said apparatus along the line 4—4 of Fig. 2 and in the direction indicated.

Fig. 5 is a perspective view of a modified form of the conveyor belt apparatus embodying the invention.

Fig. 6 is a sectional view taken through the said apparatus along the line 6—6 of Fig. 5 and in the direction indicated.

Fig. 7 is a sectional view similar to Fig. 6 and showing the manner in which said apparatus may be used with means for distributing the granular material carried on the conveyor belt.

Figure 1:
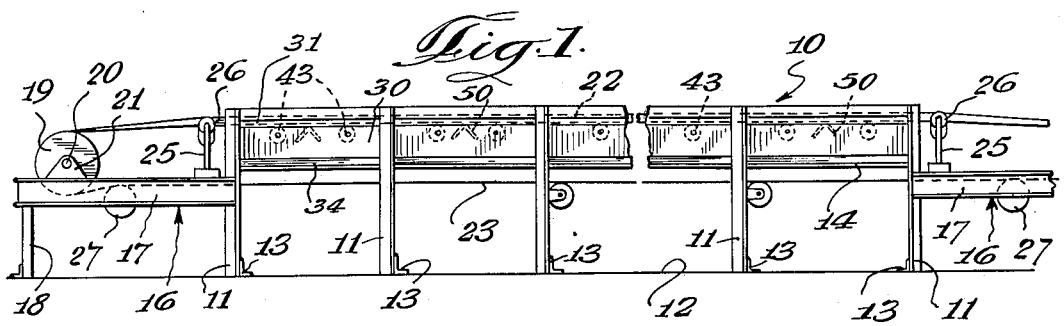
Fig. 1 is a side elevational view of the conveyor belt apparatus embodying the invention.

Referring now to the drawings, the conveyor apparatus embodying the invention as shown in Figs. 1, 2, 3 and 4 is designated generally by the reference character 10. Same includes a supporting frame fabricated from a plurality of spaced apart upright members 11 adapted to have their lower ends secured to a floor 12 by means of ordinary angle brackets 13 and fastening devices extending therethrough into said floor. Said uprights may consist of metallic angle irons so as to provide adequate rigidity. An elongate horizontally arranged angle iron 14 connects the uprights 11 in each row and suitable cross pieces may be provided for bracing each pair of opposed uprights in a well known manner.

Referring to Fig. 1, each end of the frame has a platform designated generally 16, each platform being fabricated of structural members such as I-beams 17 and legs 18 supported on floor 12. The I-beams 17 are connected to a pair of uprights 11 in any suitable manner. A roller 19 rotatably mounted on a shaft 20 is supported between each pair of I-beams 17, said shaft 19 having its respective ends journalled in a bracket 21 secured to the top of an I-beam 17. The roller 19 at the left end of the frame in Fig. 1 may be designated the head roller, whereupon the equivalent roller on the platform at the right end of the supporting frame will be the tail roller. An endless conveyor belt is mounted over and between the head and tail rollers 19, 19 thereby providing an upper reach 22 and a lower reach 23 of the conveyor belt. The granular material 24 is carried along the upper reach of the conveyor belt. The head and tail rollers 19 constitute the drive rollers of the conveying apparatus.

Each platform 16 has a bracket 25 carrying an idler roller 26 thereon adapted to be disposed beneath the upper reach 22 adjacent a roller 19 for providing support therefor. Likewise, an idler roller 27 is journalled between the I-beams 17 of each platform which is disposed beneath the lower reach 23 of the conveyor belt for supporting same.

The construction described heretofore is conventional, there usually being also a number of spaced idler rollers mounted on the frame beneath the upper and lower reaches of the conveyor belt for supporting same. This conventional construction entails considerable disadvantages as the granular material 24 spills over the edges of the upper reach 22, clogs the drive rollers 19 and idler rollers 26 and 27 and the idler rollers spaced beneath the upper reach 22 along the length thereof causing wearing and fraying of the respective rollers and the conveyor belt. These and the other disadvantages heretofore enunciated are eliminated by means of the construction hereinafter described.

Figure 3:
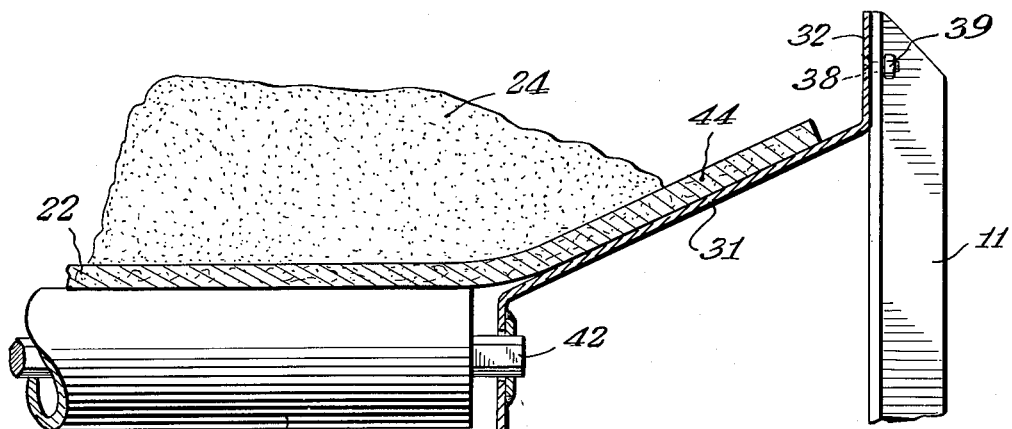
Fig. 3 is a sectional view taken through the said apparatus along the line 3—3 of Fig. 2 and in the direction indicated.

I provide a pair of elongate, continuous plate members which are mounted to support a substantial length of the upper reach 22. Each of the said members are of identical but opposite construction, so that only one of them need be described in detail. Referring to Fig. 3, one such member is shown, same consisting of a vertically arranged leg 30, portion 31 extending angularly and outwardly therefrom and another vertically arranged leg 32, said portions 30, 31 and 32 preferably being integrally formed one with the other. The leg 30 has its free end 33 welded to an L-bracket 34, the bracket 34 being in turn secured atop a cross strut 35 by means of a suitable nut 36 and bolt 37. The cross strut 35 is secured between a pair of uprights 11 and it will be understood that a plurality of cross struts may be provided along the length of the supporting frame in order adequately to support said plate member. The leg 32 is secured to an upright 11 by means of the nut 38 and bolt 39. It will be appreciated that the said plate member likewise could be secured respectively to the strut 35 and upright 11 by other suitable means, such as by welding or the like.

Figure 2:
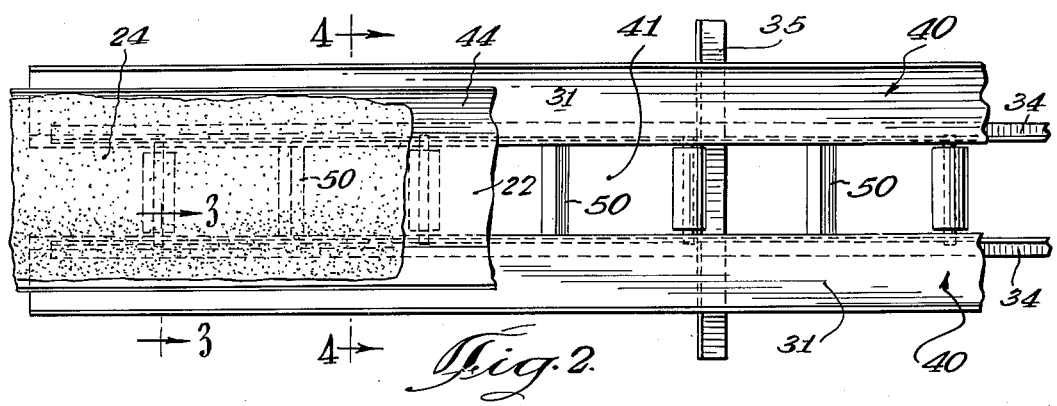
Fig. 2 is a plan view thereof with a portion broken away to show certain constructional details.

Each plate member, which is designated generally 40 in Fig. 2, is mounted on the supporting frame so as to provide a space 41 therebetween. A plurality of shafts 42 are mounted between the portions 30 of the plate members 40 and an idler roller 43 is rotatably received on each shaft 42. The roller 43 is of a length slightly shorter than the length of the space 41 and hence fits directly thereinto. The upper reach 22 is adapted to be disposed over the idler rollers 43 and be supported thereby. Referring to Fig. 3, the upper reach 22 of the conveyor belt is made wide enough so as to provide an overlap portion 44 which rides up the inclined portion 31 and is supported thereby. The portions 44 and inclined portions 31 cooperate to form a trough-like structure which funnels the material 24 back onto the reach 22 as the material is carried along the conveyor 10. This prevents the material 24 from spilling over the edges of the portion 44 of the reach 22 and eliminates the need for special troughing means or retaining means heretofore used.

Referring to Fig. 4, the strut 35 has each of its ends provided with an integral C-shaped extension 46, having an ear 47 which cooperates with the uprights 11 to support a shaft 48 between said uprights below the strut 35. Mounted on the shaft 48 is an idler roller 49 which is disposed beneath the lower reach 23 for supporting same.

It will be appreciated that a plurality of rollers 43 and 49 are provided along the length of the frame for supporting respectively the upper reach 22 and lower reach 23. Because the plate members 40 are continuous and extend substantially the extent of the upper reach 22, a reduced number of uprights, idler rollers 43 and 49 are necessary in order to support the conveyor belt. To carry out this saving of material and further to support the upper reach 22 between rollers 43, I provide a plurality of triangular struts 50 which may be mounted between the portions 30 of members 40 directly below the upper reach 22. A strut 50 is mounted between a pair of idler rollers 43 thereby reducing the number of rollers required adequately to support the upper reach and also prevent sagging of the belt between rollers 43 as was common in prior art structures.

Referring to Figs. 5, 6 and 7, there is shown a modified form of my conveyor belt construction which is designated generally by the reference character 60. Same includes a supporting frame constructed from uprights 11, an elongate horizontally disposed connecting member 14, struts 35 having idler rollers 49 for supporting the lower reach 23 of the conveyor belt, the constructional details of the above referred to members being similar to that described in connection with the conveyor 10. The upper reach 22 however is flat and same is supported on a pair of elongate, continuous plate members 61, 61 secured each to a row of uprights 11.

Referring to Fig. 6, the members 61 each include a vertically disposed leg 62, a horizontal table portion 63 and a flange 64 integral with portion 63. The portions 64 are secured to the uprights 11 and the legs 62 are secured to the strut 35 by similar brackets 34. The members 61 are spaced apart along their length and the idler rollers 43 are disposed in said space and secured between the legs 62. The table portions 63 support the upper reach 22 along its extent since said reach 22 is made wide enough to provide overlap portions 67 adapted to be supported on said tables 63. Likewise, a plurality of idler rollers 49 may be secured between the portions 62 beneath the reach 22 for supporting same, and a plurality of struts 50, one being secured between a pair of rollers 43, also secured between the portions 62 for supporting the reach 22. In this manner, the reach 22 is supported along its edges by the continuous plate members 61, 61 and adequately supported between rolls 43 by struts 50. The number of uprights 11 and rollers 43 may be materially reduced by means of this construction.

Referring to Fig. 7, one manner of using the flat belt conveyor 22 is illustrated. Mounted over the upper reach 22 is a distributing member 70, which preferably is V-shaped, the arms of the member 70 extending beyond the side edges of said reach. A chute 71 is positioned along each edge of the reach opposite the member 70. As material 24 progresses along the upper reach 22, it will be engaged by the distributing member 70 and guided into each of the chutes 71. This manner of using the flat belt conveyor 22 is permitted by reason of the support of the plate members 61 beneath the side edges of the upper reach 22.

It is believed that the herein invention has been described adequately without necessitating further details. It will be seen that I have provided a novel conveyor belt construction characterized by structure permitting the conveyor belt more adequately to be supported along its length, preventing spilling of material transported along the belt, economy of construction and durability thereof. Preferred embodiments of the invention have been shown and described so as to enable the artisan skilled in the art to which same appertains to practice the same, however,

I claim:

1. A conveyor belt construction comprising, an upright supporting frame, a drive roller mounted at opposite ends of the frame having the conveyor belt supported thereon to provide at least an upper reach along which granular material is adapted to be carried, said frame including a plurality of upright structural members arranged in a pair of laterally spaced interconnected rows and an elongate generally horizontally arranged structural member connecting the uprights of each row, a pair of elongate continuous bracket plates rigidly secured on said frame between said rows and laterally spaced one from the other, each plate including a vertically arranged planar portion and a table portion extending outwardly relative to the vertical portion and secured at points therealong to uprights of an adjacent row, the reach being supported along each side edge thereof by a said table portion and positioned over said space, a plurality of spaced idler rollers journalled at the ends thereof in said vertically arranged portions and positioned in said space supporting the said reach, a non-moving support member detachably mounted between said vertical portions and between each pair of idler rollers for supporting the portion of said reach between said rollers comprising, a triangular strut having an apex engaging the reach, said table portions extending beyond the side edges of the reach.

2. A construction as described in claim 1 in which said table portions are angularly directed relative to the uprights forming a trough-like chamber immediately above said space.

3. A construction as described in claim 1 in which said table portions are flat surfaces extending a substantial distance beyond the side edges of the reach.

References Cited in the file of this patent

UNITED STATES PATENTS

| | | |
|---|---|---|
| 2,094,728 | Tinsley | Oct. 5, 1937 |
| 2,358,609 | Uhlig | Sept. 19, 1944 |

FOREIGN PATENTS

| | | |
|---|---|---|
| 396,184 | Great Britain | Aug. 3, 1933 |
| 525,893 | Great Britain | Sept. 6, 1940 |